(12) United States Patent
Jeong et al.

(10) Patent No.: US 9,337,465 B2
(45) Date of Patent: May 10, 2016

(54) BATTERY PACK

(71) Applicant: Samsung SDI Co., Ltd., Yongin-si, Gyeonggi-do (KR)

(72) Inventors: Ik-Jae Jeong, Yongin-si (KR); Min-Cheol Bae, Yongin-si (KR); Kyoung-Hwan Noh, Yongin-si (KR); Hong-Keun Choi, Yongin-si (KR)

(73) Assignee: SAMSUNG SDI CO., LTD., Yongin-si, Gyeonggi-do (KR)

( * ) Notice: Subject to any disclaimer, the term of this patent is extended or adjusted under 35 U.S.C. 154(b) by 120 days.

(21) Appl. No.: 14/244,725

(22) Filed: Apr. 3, 2014

(65) Prior Publication Data
US 2015/0079445 A1    Mar. 19, 2015

(30) Foreign Application Priority Data
Sep. 13, 2013    (KR) .................. 10-2013-0110614

(51) Int. Cl.
| | |
|---|---|
| *H01M 2/20* | (2006.01) |
| *H01M 2/10* | (2006.01) |
| *B23K 26/40* | (2014.01) |
| *H01R 4/02* | (2006.01) |

(52) U.S. Cl.
CPC ............. *H01M 2/204* (2013.01); *B23K 26/244* (2015.10); *B23K 26/40* (2013.01); *H01M 2/105* (2013.01); *B23K 2203/08* (2013.01); *H01R 4/029* (2013.01)

(58) Field of Classification Search
CPC .............................. H01M 2/105; H01M 2/204
See application file for complete search history.

(56) References Cited

U.S. PATENT DOCUMENTS

| | | | |
|---|---|---|---|
| 2008/0131765 A1 | 6/2008 | Imanaga et al. | |
| 2008/0286636 A1* | 11/2008 | Naito ...................... | H01M 2/24 429/98 |
| 2009/0297892 A1 | 12/2009 | Ijaz et al. | |
| 2012/0013340 A1 | 1/2012 | Yuasa et al. | |
| 2013/0196204 A1 | 8/2013 | Song et al. | |

FOREIGN PATENT DOCUMENTS

| | | |
|---|---|---|
| JP | 2009-070614 A | 4/2009 |
| JP | 2011-233319 A | 11/2011 |
| KR | 2010-0134111 A | 12/2010 |

OTHER PUBLICATIONS

Extended European Search Report issued on Jan. 19, 2015 for European Patent Application No. 14182275.9.

* cited by examiner

*Primary Examiner* — Carlos Barcena
(74) *Attorney, Agent, or Firm* — Knobbe, Martens, Olson & Bear LLP

(57) ABSTRACT

Provided is a battery pack including: a plurality of unit cells; a battery holder in which the plurality of unit cells are mounted; an electrode tab arranged on the battery holder; and a bus bar of which portion is arranged on the electrode tab, wherein the battery holder includes a welding part that contacts the electrode tab.

19 Claims, 5 Drawing Sheets

BATTERY PACK

RELATED APPLICATIONS

This application claims the benefit of Korean Patent Application No. 10-2013-0110614, filed on Sep. 13, 2013, in the Korean Intellectual Property Office, the disclosure of which is incorporated herein in its entirety by reference.

BACKGROUND

1. Field

One or more embodiments of the present invention relate to a battery pack.

2. Description of the Related Technology

Portable electronic devices such as notebook computers, tablet computers, smart phones, or the like have been widely used. The portable electronic devices include a battery pack for saving power so as to allow a user to use the portable electronic devices for a certain amount of time without external power supplies. The battery pack may include a plurality of battery cells consisting of secondary batteries capable of being repeatedly charged and discharged.

When a battery pack having a plurality of battery cells is manufactured, a process for combining bus bars with electrode tabs is required.

SUMMARY OF CERTAIN INVENTIVE ASPECTS

One or more embodiments of the present invention include a battery pack with a reduced size and capable of decreasing manufacturing costs by simplifying a manufacturing procedure.

According to an embodiment of the present invention, there is provided a battery pack including: a plurality of unit cells; a battery holder in which the plurality of unit cells are mounted; an electrode tab arranged on the battery holder; and a bus bar of which a portion is arranged on the electrode tab, wherein the battery holder includes a welding part that contacts the electrode tab.

The unit cells may be cylindrical cells.

The battery holder may include: mounting surfaces on which the unit cells are mounted; and an insertion part separated from the mounting surfaces, and having a predetermined depth so as to allow the welding parts to be inserted into a top portion or a bottom portion of the battery holder.

The welding part may be arranged at a center of a top portion or a bottom portion of the battery holder.

A top surface of the welding part and that of the battery holder may be disposed on a same level.

The welding part may be formed of copper or nickel.

A top surface of the welding part and exposed terminals of the unit cells may be disposed on a same level.

The electrode tab may cover exposed terminals of the unit cells and the welding part.

The electrode tab may contact a top surface of the welding part.

The electrode tab may include connections welded to terminals of the unit cells.

The electrode tab may be formed of at least one selected from a group consisting of nickel, aluminum, copper, and silver.

The bus bar may overlap with the welding part.

The bus bar may be combined with the welding part via a welding process while the electrode tab is interposed between the bus bar and the welding part.

The welding process may be a laser welding process.

According to another embodiment of the present invention, there is provided a battery pack including: a plurality of battery holders in which a plurality of unit cells are mounted, and that are adjacent to each other; an electrode tab arranged on the battery holders; and a bus bar of which a portion is disposed on the electrode tab, wherein each of the plurality of battery holders includes: mounting surfaces on which the unit cells are mounted; an insertion part separated from the mounting surfaces, and having a predetermined depth at a top portion or a bottom portion of the each of the battery holders; and a welding part inserted into the insertion part and combined with the electrode tab.

The electrode tab may be combined with terminals of the unit cells and the welding part.

The welding part may be arranged at a bottom surface of the electrode tab combined with the bus bar.

The mounting surfaces may be at least two surfaces.

A top surface of the welding part may be arranged on a same level as terminals of the plurality of unit cells that are mounted in each of the plurality of battery holders.

The welding part may be formed of copper or nickel.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION OF CERTAIN INVENTIVE EMBODIMENTS

Figure 1:
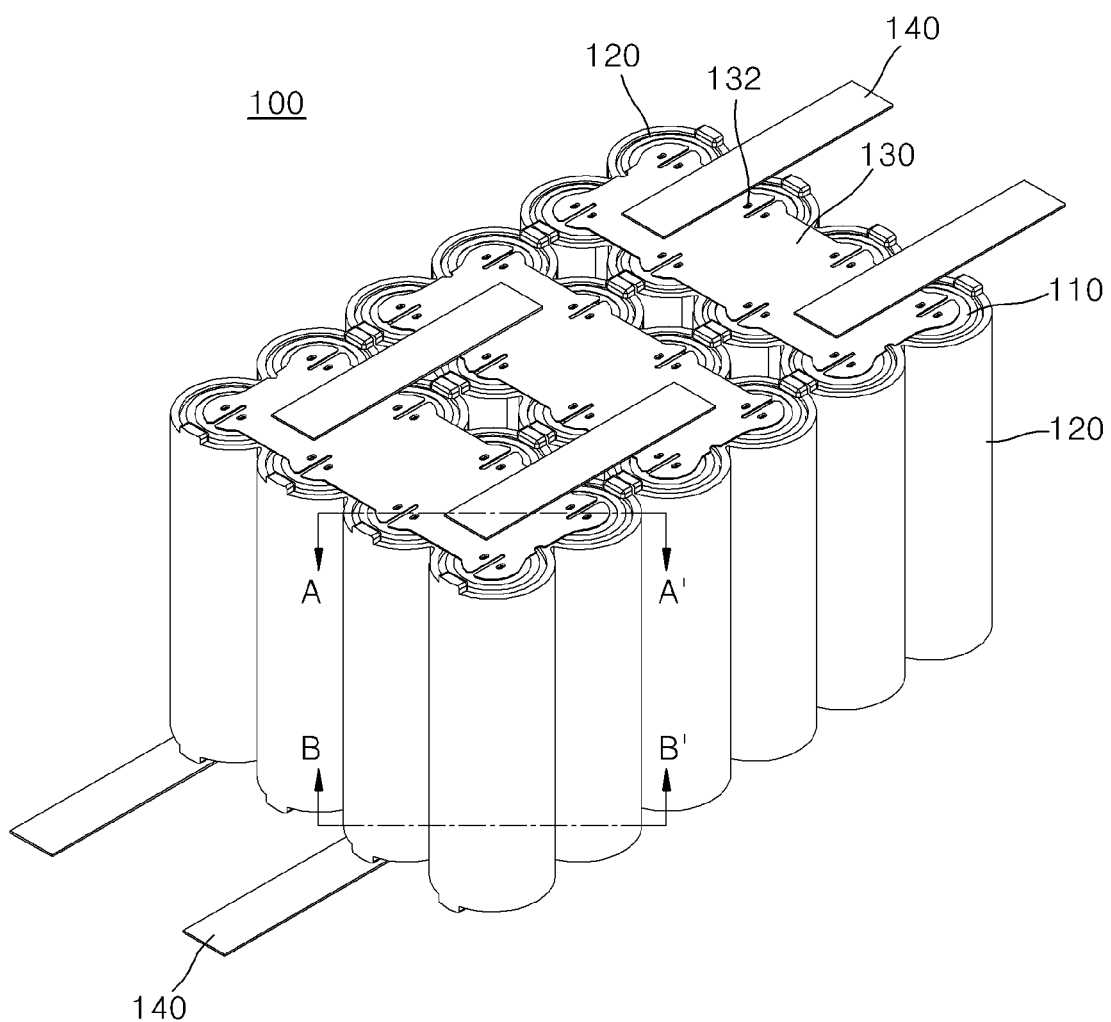
FIG. 1 is a perspective view of a battery pack according to an embodiment of the present invention.

Reference will now be made in detail to embodiments, examples of which are illustrated in the accompanying drawings, wherein like reference numerals refer to the like elements throughout. In this regard, the present embodiments may have different forms and should not be construed as being limited to the descriptions set forth herein. Accordingly, the embodiments are merely described below, by referring to the figures, to explain aspects of the present description.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

While such terms as "first," "second," etc., may be used to describe various components, such components must not be limited to the above terms. The above terms are used only to distinguish one component from another.

Figure 2:
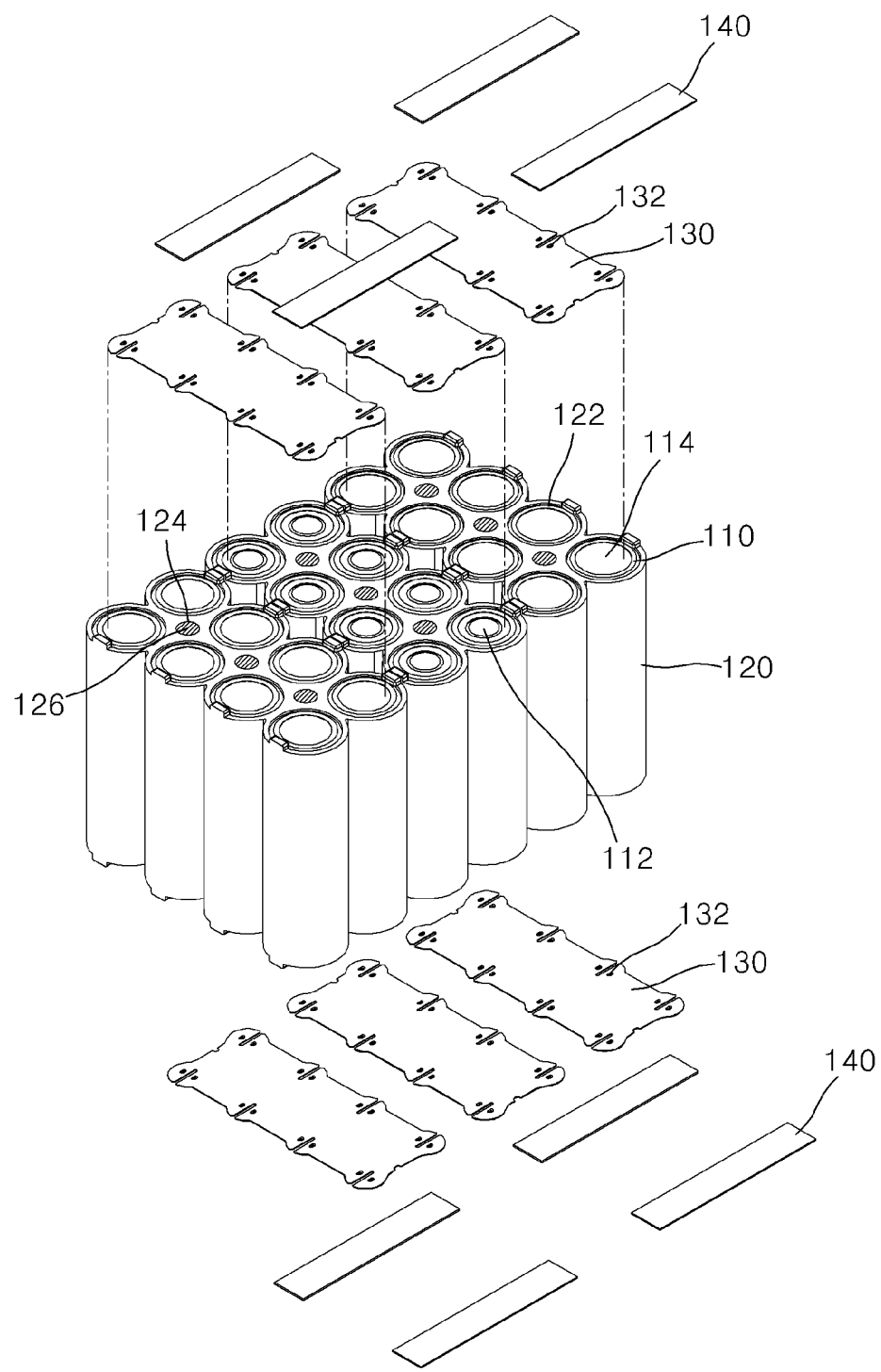
FIG. 2 is an exploded perspective view of the battery pack.

FIG. 1 is a perspective view of a battery pack 100 according to an embodiment of the present invention, and FIG. 2 is an exploded perspective view of the battery pack 100.

Referring to FIGS. 1 and 2, the battery pack 100 includes a plurality of unit cells 110; battery holders 120 on which the plurality of unit cells 110 are mounted; electrode tabs 130 that connect the plurality of unit cells 110 in series or in parallel; and bus bars 140 that are electrically connected on the electrode tabs 130.

The plurality of unit cells 110 may be cylindrical cells. In the present embodiment, each of the plurality of unit cells 110 includes a first terminal 112 at one end and a second terminal 114 at the other end. The plurality of unit cells 110 may be lithium ion cells and may be arranged on the battery holders 120 so that the neighboring unit cells 110 in the battery holders 120 may have identical polarity. That is, the unit cell 110 that is adjacent to another unit cell 110 having positive polarity at one end may have positive polarity at its one end. However, one or more embodiments of the present invention are not limited thereto, thus, the unit cells 110 that are adjacent to each other may be arranged to have different polarity, according to series or parallel connections.

The plurality of unit cells 110 may be arranged and fixed in the battery holders 120.

Each of the battery holders 120 includes mounting surfaces 122 on which the unit cell 110 is mounted; an insertion part 124 that is separated from the mounting surfaces 122 and that have a predetermined depth at an upper or lower part of the battery holder 120; and a welding part 126 formed at the insertion part 124.

The battery holder 120 may be formed of a plastic or any appropriate material, excluding the welding part 126.

The mounting surfaces 122 may have a round shape so as to match an outer surface of the cylindrical unit cell 110. However, the shape of the mounting surfaces 122 is not limited thereto, and according to a shape of the unit cell 110, the shape of the mounting surfaces 122 may vary. Also, in the present embodiment, the battery holder 120 has eight mounting surfaces 122. However, one or more embodiments of the present invention are not limited thereto, and thus, the number of the mounting surfaces 122 that are formed in the battery holder 120 may vary according to desired charge and discharge capacities.

Also, in the present embodiment, one unit cell 110 is mounted on one mounting surface 122 of the battery holder 120, but one or more embodiments of the present invention are not limited thereto, and thus, a plurality of the unit cells 110 may be vertically mounted on the mounting surfaces 122.

The insertion part 124 is formed in the battery holder 120 so as to overlap with the bus bar 140 on a certain region. For example, the insertion part 124 may be formed at a center of the battery holder 120 and may have a predetermined depth for the welding part 126. However, one or more embodiments of the present invention are not limited thereto, and thus the insertion part 124 may also be formed to be close to one of the mounting surfaces 122, according to a process.

The welding part 126 may be formed in the insertion part 124 by using a conductive material. For example, the welding part 126 may be formed of metal such as copper or nickel, but one or more embodiments of the present invention are not limited thereto. Also, the welding part 126 may be arranged on the same level as a top or bottom portion of the unit cell 110 mounted on the mounting surfaces 122. The top portion of the unit cell 110 may be a top portion of the first terminal 112, and the bottom portion of the unit cell 110 may be a bottom portion of the second terminal 114. Alternatively, the top portion of the unit cell 100 may be a bottom portion of the second terminal 114, and the bottom portion of the unit cell 110 may be a top portion of the first terminal 112.

The welding part 126, the electrode tab 130 and the bus bar 140 may be arranged to overlap with each other on a certain region, and then may be combined with each other during a welding process, for example, a laser welding process.

The electrode tab 130 is arranged on a top or bottom surface of the battery holder 120, and is electrically connected to the plurality of unit cells 110 that are adjacent to each other in the battery holders 120. The electrode tab 130 includes connections 132 at corners or between the corners so as to be welded to the first terminal 112 or the second terminal 114 of the unit cell 110. Also, the electrode tab 130 is arranged on the battery holder 120 so as to cover the welding part 126 of the battery holder 120.

The electrode tab 130 may be formed of a metal material having good conductivity. For example, the electrode tab 130 may be formed of at least one material selected from a group consisting of nickel, aluminum, copper, and silver, but one or more embodiments of the present invention are not limited thereto. Also, in the present embodiment, the electrode tab 130 electrically connects the eight unit cells 110, but one or more embodiments of the present invention are not limited thereto. The number of the unit cells 110 that are electrically connected to one electrode tab 130 may vary.

The bus bar 140 is arranged on the top surface of the electrode tab 130 and overlaps with the welding part 126 in a predetermined region. The bus bars 140 may be electrically and mechanically connected to the electrode tab 130 through a welding process.

A portion of the bus bar 140 may be arranged on the top surface of the electrode tab 130, but the other portion of the bus bar 140 may be arranged on another electrode tab 130. By doing so the bus bar 140 may function as a medium for electrically connecting two adjacent battery holders 120. When the electrode tabs 130 are sequentially connected by using the bus bars 140, a high-capacity battery pack 100 may be manufactured. In the present embodiment, each of the three battery holders 120 houses the eight unit cells 110, so that the battery pack 100 is formed, but the number of the battery holders 120 included in the battery pack 100 may be determined according to desired charge and discharge capacities.

The other portion of the bus bar 140 may not be arranged on the top surface of the other electrode tab 130 but may be electrically connected, as a first terminal or a second terminal of the battery pack 100, to an external terminal (not shown).

According to the present invention, the battery holder 120 may include the welding part 126 so that the battery holder 120 may connect the electrode tab 130 and the bus bar 140 through a welding process.

A thickness of the electrode tab 130 that is arranged on the battery holder 120 and electrically connects the plurality of unit cells 110 is relatively smaller than a thickness of the bus bar 140. Therefore, there is a limit in connecting the electrode tab 130 and the bus bar 140 by welding, but because the welding part 126 is arranged below the electrode tab 130, the electrode tab 130 and the bus bar 140 may be connected through the welding process. The welding process may be a laser welding process, but one or more embodiments of the present invention are not limited thereto.

Also, the bus bar 140 and the electrode tab 130 may be combined with each other through the welding process, without using a coupling unit such as a bolt, so that a manufacturing procedure may be simplified, manufacturing costs may be reduced, and a size of the battery pack 100 may be decreased.

Figure 3:
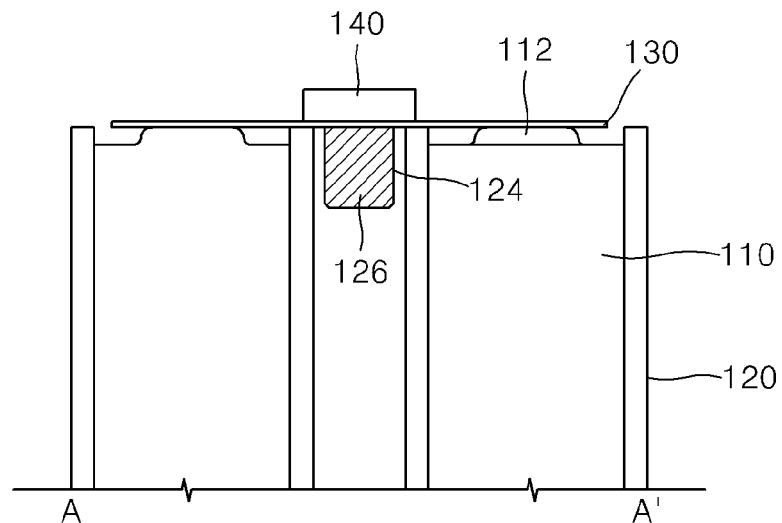
FIG. 3 is a schematic cross-sectional view of the battery pack of FIG. 1, taken along a line A-A' of FIG. 1.
Figure 4:
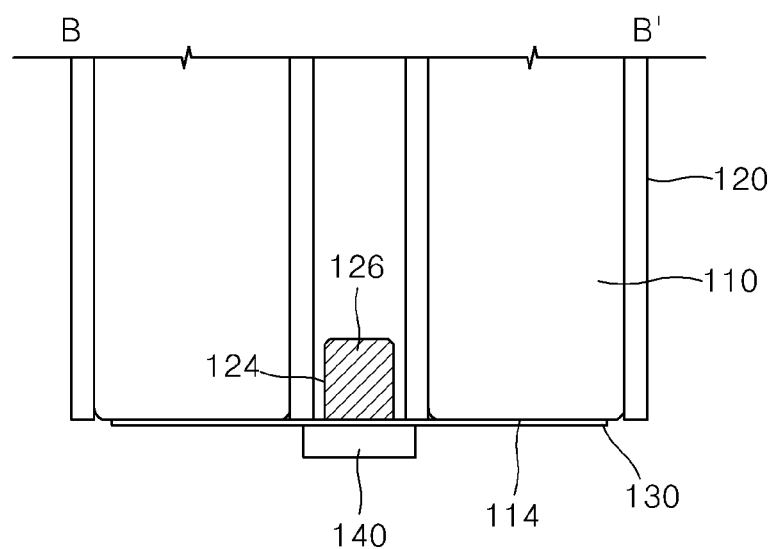
FIG. 4 is a schematic cross-sectional view of the battery pack of FIG. 1, taken along a line B-B' of FIG. 1.

FIG. 3 is a schematic cross-sectional view of the battery pack 100 of FIG. 1, taken along a line A-A' of FIG. 1, and FIG. 4 is a schematic cross-sectional view of the battery pack 100 of FIG. 1, taken along a line B-B' of FIG. 1.

Referring to FIG. 3, the plurality of unit cells 110 mounted on the mounting surfaces 122 of the battery holder 120 are separated from each other, and by forming the insertion part 124 having a predetermined depth in the center of the battery holder 120, the welding part 126 may be mounted in the insertion part 124.

The top surface of the welding part 126 may be arranged on the same level as the top surface of the battery holder 120, and the bottom surface of the electrode tab 130 that contacts the first terminals 112 of the unit cells 110 may be combined with the top surface of the welding part 126.

In more detail, the bus bar 140 and the welding part 126 are arranged to overlap with each other in a certain region by having the electrode tab 130 interposed therebetween, and then the welding part 126 having a predetermined thickness is arranged on the bottom surface of the electrode tab 130.

Therefore, the electrode tab 130 having a thickness relatively smaller than that of the bus bar 140 may be easily combined with the bus bar 140 through the welding process.

In addition, the top surface of the welding part 126 may be arranged at the same level as the top portion of the first terminal 112 of the unit cell 110.

Because the first terminal 112 of the unit cell 110, the upper surface of the welding part 126 and the upper surface of the battery holder 120 are disposed on the same level, the battery holder 120 may be strongly combined with the electrode tab 130.

Referring to FIG. 4, the bottom surface of the welding part 126 may be arranged on the same layer as the bottom surface of the battery holder 120, and the top surface of the electrode tab 130 that contacts the second terminals 114 of the unit cells 110 is combined with the bottom surface of the welding part 126.

In more detail, the bus bar 140 and the welding part 126 are arranged to overlap with each other in a certain region by having the electrode tab 130 interposed therebetween, and the welding part 126 having a predetermined thickness is arranged on the top portion of the electrode tab 130 that is connected to the bus bar 140.

Also, the bottom surface of the welding part 126 may be arranged on the same level as the bottom portion of the second terminal 114 of the unit cell 110.

Figure 5:
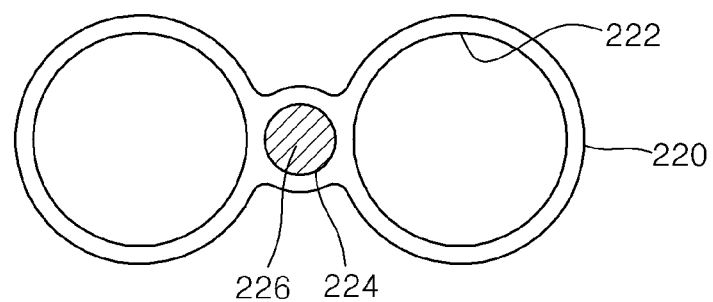
FIGS. 5 through 7 are plane views schematically illustrating battery holders according to embodiments of the present invention.
Figure 6:
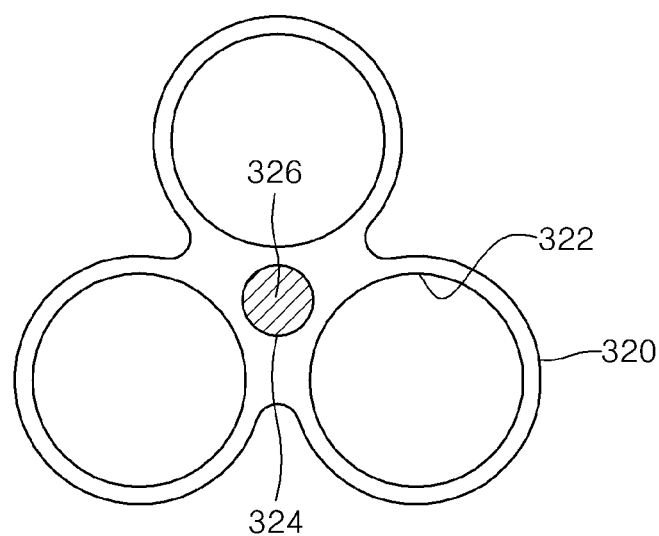
Figure 7:
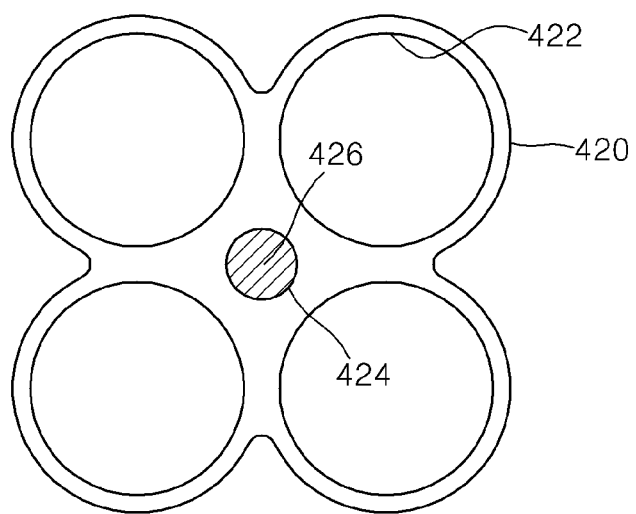

FIGS. 5 through 7 are plane views schematically illustrating battery holders 220, 320, and 420 according to embodiments of the present invention.

Referring to FIG. 5, the battery holder 220 includes a plurality of mounting surfaces 222 on which two unit cells (not shown) are mounted; an insertion part 224 that is separated from the mounting surfaces 222; and a welding part 226 that is mounted on the insertion part 224.

Unlike the battery holder 120 illustrated in FIGS. 1 and 2, the battery holder 220 may have the two mounting surfaces 222 on which the two unit cells are mounted, and the welding part 226 may be formed in a gap between the two mounting surfaces 222.

Referring to FIG. 6, the battery holder 320 includes a plurality of mounting surfaces 322 on which three unit cells (not shown) are mounted; an insertion part 324 that is separated from the mounting surfaces 322; and a welding part 326 that is mounted on the insertion part 324.

Unlike the battery holder 120 illustrated in FIGS. 1 and 2, the battery holder 320 may have the three mounting surfaces 322 on which the three unit cells are mounted, and the welding part 326 may be formed in a gap between the three mounting surfaces 322, that is, the welding part 326 may be formed at the center of the battery holder 320.

Referring to FIG. 7, the battery holder 420 includes a plurality of mounting surfaces 422 on which four unit cells (not shown) are mounted; an insertion part 424 that is separated from the mounting surfaces 422; and a welding part 426 that is mounted on the insertion part 424.

Unlike the battery holder 120 illustrated in FIGS. 1 and 2, the battery holder 420 may have the four mounting surfaces 422 on which the four unit cells are mounted, and the welding part 426 may be formed in a gap between the four mounting surfaces 422, that is, the welding part 426 may be formed at the center of the battery holders 420.

Referring to FIGS. 5 through 7, shapes of the welding parts 226, 326 and 426 are round, but one or more embodiments of the present invention are not limited thereto, thus, the shapes may vary.

While this invention has been particularly shown and described with reference to preferred embodiments thereof, it will be understood by those skilled in the art that various changes in form and details may be made therein without departing from the spirit and scope of the invention as defined by the appended claims. The preferred embodiments should be considered in descriptive sense only and not for purposes of limitation. Therefore, the scope of the invention is defined not by the detailed description of the invention but by the appended claims, and all differences within the scope will be construed as being included in the present invention.

What is claimed is:
1. A battery pack comprising:
a plurality of unit cells;
a battery holder in which the plurality of unit cells are mounted;
an electrode tab arranged on the battery holder; and
a bus bar of which portion is arranged on the electrode tab,
wherein the battery holder comprises a welding part that contacts the electrode tab;
mounting surfaces on which the plurality of unit cells are mounted; and
an insertion part separated from the mounting surfaces, and having a predetermined depth so as to allow the welding part to be inserted into a top portion or a bottom portion of the battery holder and wherein the electrode tab and the bus bar are welded to the welding part.

2. The battery pack of claim 1, wherein the plurality of unit cells are cylindrical cells.

3. The battery pack of claim 1, wherein the welding part is arranged at a center of a top portion or a bottom portion of the battery holder.

4. The battery pack of claim 1, wherein a top surface of the welding part and a top surface of the battery holder are disposed on a same level.

5. The battery pack of claim 1, wherein the welding part is formed of copper or nickel.

6. The battery pack of claim 1, wherein a top surface of the welding part and exposed terminals of the plurality of unit cells are disposed on a same level.

7. The battery pack of claim 1, wherein the electrode tab covers exposed terminals of the plurality of unit cells and the welding part.

8. The battery pack of claim 1, wherein the electrode tab contacts a top surface of the welding part.

9. The battery pack of claim 1, wherein the electrode tab comprises connections welded to terminals of the plurality of unit cells.

10. The battery pack of claim 1, wherein the electrode tab is formed of at least one selected from a group consisting of nickel, aluminum, copper, and silver.

11. The battery pack of claim 1, wherein the bus bar overlaps with the welding part.

12. The battery pack of claim 1, wherein the bus bar is combined with the welding part via a welding process while the electrode tab is interposed between the bus bar and the welding part.

13. The battery pack of claim 12, wherein the welding process comprises a laser welding process.

14. A battery pack comprising:
  a plurality of battery holders in which a plurality of unit cells are mounted, and that are adjacent to each other;
  an electrode tab arranged on the plurality of battery holders; and
  a bus bar of which portion is disposed on the electrode tab,
  wherein each of the plurality of battery holders comprises:
    mounting surfaces on which the plurality of unit cells are mounted;
    an insertion part separated from the mounting surfaces, and having a predetermined depth at a top portion or a bottom portion of the each of the plurality of battery holders; and
    a welding part inserted into the insertion part and combined with the electrode tab wherein the bus bar and electrode tabs are welded to the welding part.

15. The battery pack of claim 14, wherein the electrode tab is combined with terminals of the plurality of unit cells and the welding part.

16. The battery pack of claim 14, wherein the welding part is arranged at a bottom surface of the electrode tab combined with the bus bar.

17. The battery pack of claim 14, wherein the mounting surfaces are at least two surfaces.

18. The battery pack of claim 14, wherein a top surface of the welding part is arranged on a same level as terminals of the plurality of unit cells that are mounted in each of the plurality of battery holders.

19. The battery pack of claim 14, wherein the welding part is formed of copper or nickel.

* * * * *